June 16, 1925.  
W. PARK ET AL  
PORRIDGE MIXER  
Filed March 31, 1924
1,542,574
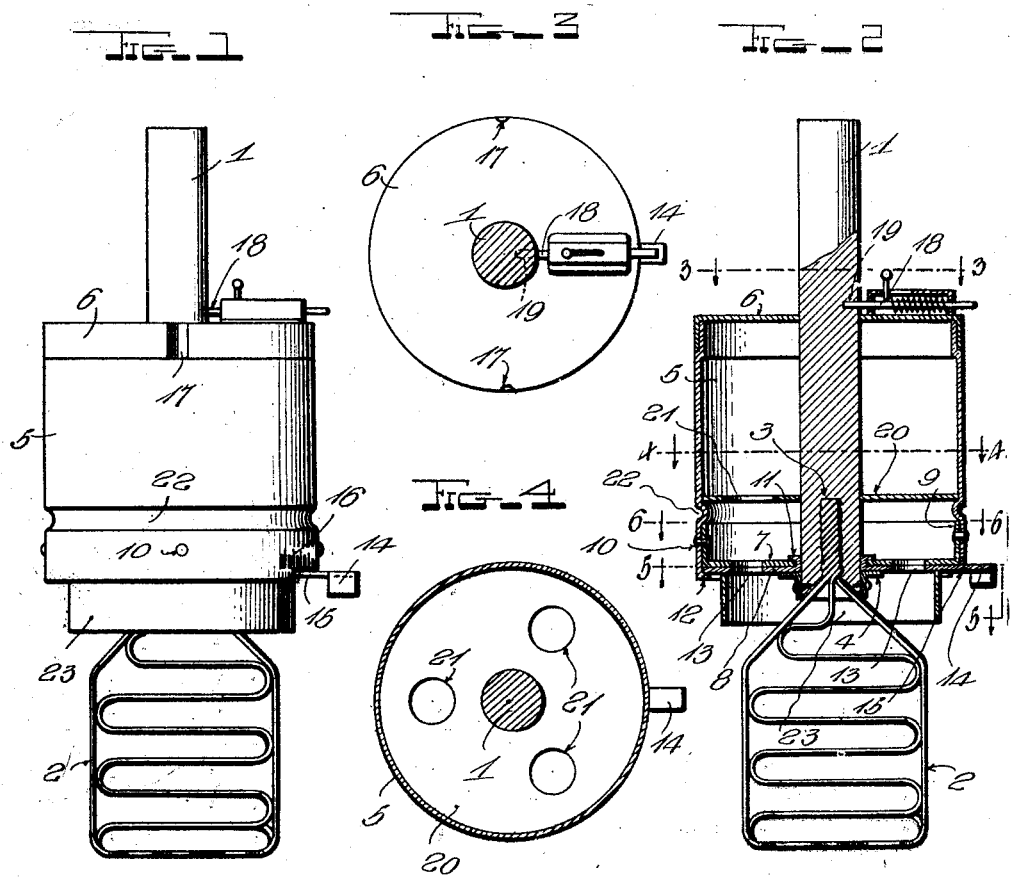
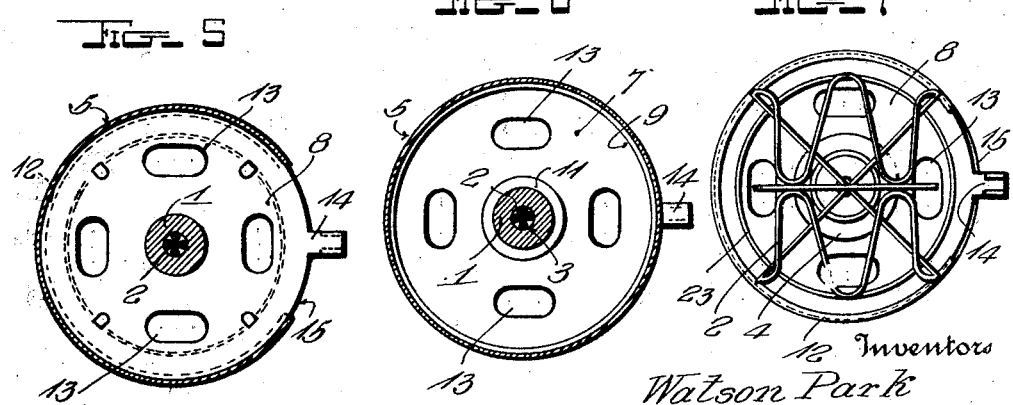
Inventors  
Watson Park  
Emma L. Park Patented June 16, 1925.

1,542,574

UNITED STATES PATENT OFFICE.

WATSON PARK AND EMMA LURA PARK, OF FAIR GROUND, ONTARIO, CANADA.

PORRIDGE MIXER.

Application filed March 31, 1924. Serial No. 703,318.

*To all whom it may concern:*

Be it known that we, WATSON PARK and EMMA L. PARK, citizens of the Dominion of Canada, residing at Fair Ground, in the Province of Ontario, Dominion of Canada, have invented a new and useful Porridge Mixer, of which the following is a specification.

Our invention relates generally to kitchen utensils, and particularly to devices which may be used for making porridge and batter, and has been carefully designed so that porridge or batter may be quickly and easily made without being lumpy.

The device includes a handled stirrer with which the meal is mixed with water contained in a kettle or other cooking utensil. Upon this handle is detachably fastened a receptacle in which the proper amount of meal for the porridge or batter is placed. The bottom of this receptacle is provided with a discharge located adjacent the mixing and mashing wires of the stirrer, so that as a stirring movement is given to the stirrer, the meal will be sifted or discharged through the bottom of the receptacle into the water contained in the kettle.

The novelty contained in the invention is hereinafter fully set forth and claimed, reference being made to the accompanying drawings, in which a preferred embodiment of the invention is illustrated. In these drawings:—

Figure 1 is a side elevation of a device constructed in accordance with the invention;

Figure 2 is a vertical longitudinal sectional view;

Figure 3 is a horizontal sectional view taken substantially on the plane indicated by line 3—3 of Fig. 2, illustrating particularly the top of the meal receptacle and the latch by which the receptacle is detachably fastened to the handle of the stirrer;

Figure 4 is a transverse sectional view taken substantially on the plane indicated by the line 4—4 of Fig. 2;

Figures 5 and 6 are transverse sectional views taken substantially on the planes of the lines 5—5 and 6—6 respectively of Fig. 2; and Figure 7 is a bottom view of the device.

In the illustrated embodiment of the invention, the reference numeral 1 designates a handle, to the lower end of which is secured, in any suitable manner, a plurality of curved or irregular mixing and mashing wires 2. By preference, the ends of these wires are brought together and twisted and tightly fitted or otherwise secured in a deep central recess 3 formed in the lower end of the handle 1.

Fixed around the lower end of the handle 1 is a collar 4, which serves as a support for the hereinafter described meal receptacle, and also a ferrule to prevent splitting of the handle 1.

The above referred to meal receptacle consists of a substantially cylindrical body member 5 provided with a removable top 6 and a bottom consisting of a fixed plate 7 and a turnably mounted disk 8.

The peripheral edge of the plate 7 is provided with an annular flange 9 which extends upwardly on the inside of the lower end of the body member 5 and is secured thereto by means of rivets 10 or in any other suitable manner. The central portion of the disk 8 is provided with an opening, the edge of which is bent around the edge of a similar opening in the plate 7 in the manner shown at 11. The lower edge of the body member 5 extends below the disk 8 and is bent around the peripheral edge of the latter as shown at 12.

The plate 7 and the disk 8 are provided with elongated aperatures 13 adapted to be brought in and out of registry by the turning of the disk 8 with respect to the plate 7. In order to turn the disk 8, the latter is provided at one edge with a projecting ear 14, a notch 15 being cut in the lower edge of the body member 5 to receive the ear 14 and to limit the turning movement of the disk 8. In order to determine the position of the apertures 13 from the position of the ear 14, the outside of the body member 5 adjacent the notch 15 is provided with a series of graduations 16.

The top 6 of the meal receptacle is flanged as shown in Figs. 1 and 2, and the flange and upper end of the body member 5 are grooved or depressed at diametrically opposite points as at 17 to prevent the top from turning or rotating upon the body member. The top 6 is provided with a central opening arranged in alinement with the opening in the bottom of the receptacle, and carries a spring-pressed latch 18 adapted to engage a notch 19 arranged in the handle 1, when the latter is inserted through the openings in the top and bottom of the receptacle.

From the foregoing, it will be understood that in using the device for making porridge or mixing batter, the meal receptacle is to be fastened on the handle 1 in the manner shown in Fig. 2. From this view, it will be seen that the bottom of the receptacle rests upon the collar 4 and that the latch 18 not only holds the entire receptacle upon the handle 1 but also holds the top 6 upon the body member 5.

In addition to the parts above described, the device includes a plate 20 removably disposed in the receptacle in spaced relation from the bottom thereof. This plate 20 is provided with a central opening through which the handle 1 extends and with a series of openings 21 offset from the center. By preference, it is movably disposed in the receptacle and merely rests upon an internal rib 22 formed in the wall of the body member 5. It is the intention to have the device provided with several of the plates 20 having openings 21 of different sizes, so that the proper one can be used depending upon the particular character of the meal with which the porridge or batter is to be made.

The device also includes a flange 23 which is secured in any suitable manner to the disk 8 and depends therefrom. This flange is provided for the purpose of preventing flirting of the meal as it is discharged through the apertures 13.

In using the device, meal is placed in the receptacle so that when the handled stirrer is given a stirring movement in a kettle of boiling water or the like, the meal will sift downwardly or flow through the apertures 13 into the water and will be thoroughly mixed and stirred, forming porridge or batter without lumps. The plate 20 is provided for the purpose of retarding the flow of meal from the upper portion of the receptacle to the lower portion. In this way, there will always be a constant flow of a small amount of the meal through the apertures 13. The receptacle as a whole may be easily disconnected from the handle 1 and the handle with the wires 2 may be used as an ordinary potato masher.

From the foregoing description taken in connection with the accompanying drawing, the construction, use and advantages of the invention will be readily understood without further explanation.

It will be seen that numerous changes in form, proportion, and various of the details of construction may be made without departing from the spirit and principle of the invention or without sacrificing any of the advantages thereof, so that it is to be understood that such changes may be made within the meaning and scope of the appended claims.

What is claimed is:—

1. A device of the class described comprising a handled stirrer, a receptacle provided with a removable top and a bottom having discharge apertures, the top and bottom of said receptacle having centrally disposed apertures through which the handle of said stirrer extends, and means for detachably clamping said receptacle upon said handle with the bottom of said receptacle adjacent the stirrer proper, said means also clamping said top upon said receptacle.

2. A device of the class described comprising a handled stirrer, a receptacle provided with a removable top and a bottom having discharge apertures, the top and bottom of said receptacle having centrally disposed apertures through which the handle of said stirrer extends, a collar fixed upon said handle adjacent the stirrer proper and against which the bottom of said receptacle rests, and a latch mounted upon the top of said receptacle and engaging said handle to detachably lock said receptacle upon said handle and said top upon said receptacle.

3. A device of the class described comprising a handled stirrer, and a receptacle fastened on the handle of said stirrer above the stirrer proper, the bottom of said receptacle consisting of a fixed plate and a turnable disk, said plate and disk having discharge apertures adapted to be brought in and out of registry by the turning of said disk relative to said plate.

4. A device as specified in claim 3, and in addition thereto, an apertured plate removably disposed in said receptacle in spaced relation from the bottom thereof to retard the flow of the contents of said receptacle from the upper part thereof to the lower part thereof.

5. A structure as specified in claim 3, and in addition thereto, an annular flange depending from the bottom of the receptacle to direct the contents being discharged toward the mixer proper.

In testimony whereof we have hereunto set our hands in the presence of two subscribing witnesses at Fair Ground this 13th day of March, 1924.

WATSON PARK.
    EMMA LURA PARK.

Witnesses:
  LETA G. PARK,
  H. E. CUTTER.